United States Patent
Grunzke

(10) Patent No.: US 9,043,518 B2
(45) Date of Patent: *May 26, 2015

(54) METHOD AND APPARATUS FOR CALIBRATING A MEMORY INTERFACE WITH A NUMBER OF DATA PATTERNS

(71) Applicant: Micron Technology, Inc., Boise, ID (US)

(72) Inventor: Terry M. Grunzke, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 14/164,299

(22) Filed: Jan. 27, 2014

(65) Prior Publication Data

US 2014/0229687 A1 Aug. 14, 2014

Related U.S. Application Data

(63) Continuation of application No. 13/280,714, filed on Oct. 25, 2011, now Pat. No. 8,639,865.

(51) Int. Cl.
*G06F 12/00* (2006.01)
*G06F 3/00* (2006.01)
*G06F 3/06* (2006.01)
*G06F 13/16* (2006.01)

(52) U.S. Cl.
CPC ............ *G06F 3/061* (2013.01); *G06F 13/1694* (2013.01); *G06F 3/0655* (2013.01); *G06F 3/0688* (2013.01)

(58) Field of Classification Search
USPC ......... 710/34, 72–74; 711/167–169; 714/786, 714/719
See application file for complete search history.

(56) References Cited

U.S. PATENT DOCUMENTS

| | | |
|---|---|---|
| 6,434,081 B1 | 8/2002 | Johnson et al. |
| 6,629,225 B2 | 9/2003 | Zumkehr |
| 6,889,357 B1 | 5/2005 | Keeth et al. |
| 7,318,167 B2 | 1/2008 | Li et al. |
| 7,444,559 B2 | 10/2008 | Swanson et al. |
| 7,620,116 B2 | 11/2009 | Bessios et al. |
| 7,694,202 B2 | 4/2010 | Swanson et al. |
| 7,721,135 B2 | 5/2010 | Lee et al. |
| 7,965,763 B2 | 6/2011 | Xiao et al. |
| 8,271,239 B2 | 9/2012 | Hollis |
| 8,300,464 B2 | 10/2012 | Welker et al. |
| 8,407,441 B2 | 3/2013 | Giovanni et al. |
| 8,499,227 B2* | 7/2013 | Liikanen et al. ............. 714/786 |
| 8,667,347 B2* | 3/2014 | Zerbe et al. .................. 714/719 |
| 2009/0307521 A1 | 12/2009 | Lee et al. |

OTHER PUBLICATIONS

Casper et al., "Peak Distortion ISI Analysis," Circuits Research Lab, Intel Corporation, PowerPoint presentation, prior to Jan. 12, 2007, 78 pp.

* cited by examiner

*Primary Examiner* — Tammara Peyton
(74) *Attorney, Agent, or Firm* — Brooks, Cameron & Huebsch, PLLC

(57) ABSTRACT

Apparatuses and methods of calibrating a memory interface are described. Calibrating a memory interface can include loading and outputting units of a first data pattern into and from at least a portion of a register to generate a first read capture window. Units of a second data pattern can be loaded into and output from at least the portion of the register to generate a second read capture window. One of the first read capture window and the second read capture window can be selected and a data capture point for the memory interface can be calibrated according to the selected read capture window.

14 Claims, 4 Drawing Sheets

METHOD AND APPARATUS FOR CALIBRATING A MEMORY INTERFACE WITH A NUMBER OF DATA PATTERNS

PRIORITY INFORMATION

This application is a continuation of U.S. application Ser. No. 13/280,714, filed Oct. 25, 2011, which will issue as U.S. Pat. No. 8,639,865 on Jan. 28, 2014, which is incorporated by reference.

TECHNICAL FIELD

The present disclosure relates generally to semiconductor memory apparatuses and methods, and more particularly, to calibrating memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), phase change random access memory (PCRAM), resistive random access memory (RRAM), and magnetic random access memory (MRAM), such as spin torque transfer random access memory (STT RAM), among others.

Memory devices can include a reference signal to accompany data signals during a read operation. The reference signal, e.g., a strobe, can be used to track the output timing of the data signals read from the memory. The strobe signal may be generated during the read operation to enable a data latch, e.g., flip-flop, to properly latch the data read from the memory. The strobe signal can be analogized to a clock signal. When a strobe is received in phase with the data it is latching, the strobe may be centered in the middle of the read capture window, e.g., eye, of the data signal to help the latch accurately time the latch operation. The centering of the strobe may be accomplished with an adjustable delay circuit, e.g., a delay locked loop (DLL), which delays the strobe so that the latching edge of the strobe is received by the latch when the middle of the read capture window of the data signal is received by the latch.

DETAILED DESCRIPTION

Figure 1:
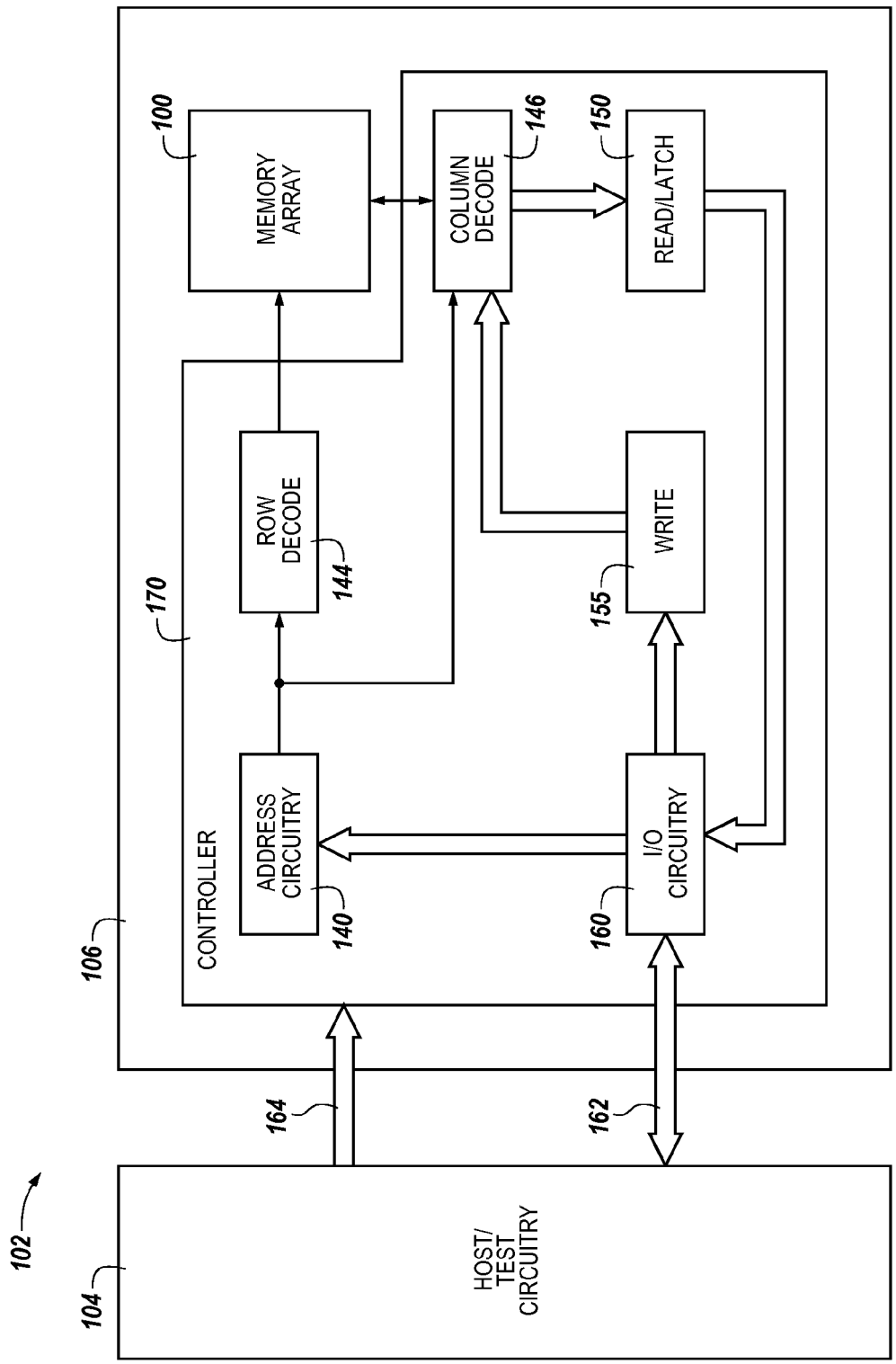
FIG. 1 illustrates a block diagram of a memory apparatus operated in accordance with a number of embodiments of the present disclosure.

Apparatuses and methods of calibrating a memory interface are described. Calibrating a memory interface can include loading and outputting units of a first data pattern into and from at least a portion of a register to generate a first read capture window. Units of a second data pattern can be loaded into and output from at least the portion of the register to generate a second read capture window. One of the first read capture window and the second read capture window can be selected and a data capture point for the memory interface can be calibrated according to the selected read capture window.

A number of embodiments of the present disclosure can calibrate a memory interface, e.g., a non-volatile memory interface, using a number of data patterns tailored specifically to the memory interface, e.g., as opposed to using a predefined data pattern as in some previous approaches to calibrating DRAM. For example, several data patterns can be tested to determine which generates an "optimal" read capture window as described herein, and/or peak distortion analysis (PDA) can be performed on the memory interface to determine the optimal read capture window. Such embodiments can improve performance of the memory interface, e.g., provide for a faster speed interface, without altering the design of the interface.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "P" and "Q," particularly with respect to reference numerals in the drawings, indicates that a number of the particular feature so designated can be included with a number of embodiments of the present disclosure. As used herein, "a number of" something can refer to one or more of such things. As used herein, an "apparatus" can refer to a device, a system, and/or a combination thereof.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 illustrates a block diagram of a memory apparatus 102 operated in accordance with a number of embodiments of the present disclosure. The memory apparatus 102 can include a host and/or test circuitry 104, e.g., a processor, a computing device including a number of processors, an application specific integrated circuit (ASIC), etc., coupled to the memory device 106, e.g., to a memory controller 170 of the memory device 106. The memory controller 170 and/or various components thereof can be on a same die as a memory array 100, can be on a different die than the memory array 100, but in a same module, or can be in a memory system, e.g., a solid state drive, which includes such a memory module/die. The memory device 106 can include the memory array 100.

Although one memory array 100 is shown in FIG. 1, embodiments of the present disclosure are not so limited, e.g., the memory device 106 can include more than one memory array 100.

The memory device 106 can include a controller 170 coupled to the memory array 100. The memory device 106 can include a memory interface including a register, e.g., a memory page register, such as may be included in the read/latch circuitry 150 coupled to the memory array 100 as described in more detail with respect to FIG. 2. The controller 170 can be configured to load units of a data pattern into and output the units from at least a portion of the register, e.g., sequentially, without writing the data pattern to the memory array 100 or reading the data pattern from the memory array 100. Sequentially loading and outputting units of a data pattern can include, in order, loading a first unit, outputting the first unit, loading a second unit, outputting the second unit, and so on. The register can be capable of storing a particular number of units, e.g., bits, proportional to a number of connections to the memory array 100. For example, the register can be 32 bits wide, however embodiments are not so limited. In some embodiments, a data pattern can be loaded into and output from one portion of the register one unit at a time in sequence. In a number of embodiments, the controller 170 can be configured to sequentially load units of a plurality of data patterns into and output the units from respective portions of the register without writing the plurality of data patterns to the memory array 100. For example, each of the plurality of data patterns can be loaded into and output from at least a respective portion of the register. In some instances, a particular data pattern can be loaded to and output from more than one portion of the register. In a number of embodiments, a portion of a register is capable of storing one unit of data at a time.

The controller 170 can be configured to determine a read capture window generated by loading and outputting each data pattern. The controller 170 can be configured to calibrate a read capture point according to the read capture window generated by the data pattern and/or a selected optimal read capture window associated with a number of the plurality of data patterns. In some embodiments, an optimal read capture window can comprise a narrowest, e.g., shortest duration, read capture window. The memory device 106 can include error circuitry, such as error correction code (ECC) circuitry that can be configured to correct a particular number of erroneous units in a given operation. In various embodiments, an optimal read capture window can comprise a narrowest read capture window after discounting a number of narrower read capture windows corresponding to a number of units correctable by error circuitry. For example, if error circuitry is able to correct for one unit, then the narrowest read capture window after discounting the (one) narrowest read capture window corresponding to the one unit correctable by error circuitry would be the second narrowest read capture window. The controller 170 can be configured to calibrate the read capture point at a center of the selected read capture window. Read capture windows and read capture points are described in more detail with respect to FIGS. 3 and 4A-4B. The controller 170 can be configured to perform peak distortion analysis (PDA) on the memory interface. PDA is described in more detail with respect to FIGS. 4A-4B.

The host and/or test circuitry 104 can be configured to input a data pattern and/or a plurality of data patterns into the controller 170, e.g., into at least a portion of the register. The controller 170 can be configured to output units of the data pattern and/or data patterns from the register to the host and/or test circuitry 104. The host and/or test circuitry 104 can be configured to determine a respective read capture window generated by each of the data patterns and to calibrate a read capture point according to a particular read capture window, e.g., an optimal read capture window, associated with one of the data patterns. The memory interface and/or read/latch circuitry 150 can include an adjustable delay circuit coupled to the register. The adjustable delay circuit can be configured to adjust the read capture point according to a signal from the controller 170. The controller 170 can be configured to transmit the signal to the adjustable delay circuit according to the calibrated read capture point from the host and/or test circuitry 104. The host and/or test circuitry 104 can be configured to perform the PDA on the memory interface, as described herein.

The memory array 100 of memory cells can be floating gate flash memory cells with a NAND architecture, for example. The controller 170 can include address circuitry 140 to latch address signals provided over I/O connections 162 through I/O circuitry 160. Address signals are received and decoded by a row decoder 144 and a column decoder 146 to access the memory array 100. The number of address input connections depends on the density and architecture of the memory array 100 and that the number of addresses increases with both increased numbers of memory cells and increased numbers of memory blocks and arrays.

The controller 170 can read data in the memory array 100 by sensing voltage and/or current changes in the memory array columns using sensing circuitry that in this embodiment can be read/latch circuitry 150. The read/latch circuitry 150 can read and latch a page, e.g., a row, of data from the memory array 100. I/O circuitry 160 is included for bi-directional data communication over the I/O connections 162 with the host and/or test circuitry 104. Write circuitry 155 is included to write data to the memory array 100.

The controller 170 can decode signals provided by control connections 164 from the host and/or test circuitry 104. These signals can include chip signals, write enable signals, and address latch signals that are used to control the operations on the memory array 100, including data read, data write, and data erase operations, as described herein. The control connections 164 and the I/O connections 162 can be collectively referred to as a host interface coupling the controller 170 to the host and/or test circuitry 104. In a number of embodiments, the controller 170 is responsible for executing instructions from the host and/or test circuitry 104 to perform the operations according to embodiments of the present disclosure. The controller 170 can be a state machine, a sequencer, control circuitry, or some other type of controller. The controller 170 can be a discrete component including one or more of the address circuitry 140, row decoder 144, column decoder 146, read/latch circuitry 150, write circuitry 155, and/or I/O circuitry 160, or the controller 170 can refer generically to the functionality provided by one or more of the address circuitry 140, row decoder 144, column decoder 146, read/latch circuitry 150, write circuitry 155, and/or I/O circuitry 160. Although not specifically illustrated in FIG. 1, the controller 170 can be a component separate from the address circuitry 140, row decoder 144, column decoder 146, read/latch circuitry 150, write circuitry 155, and/or I/O circuitry 160. It will be appreciated by those skilled in the art that additional circuitry and control signals can be provided, and that the memory device detail of FIG. 1 has been reduced to facilitate ease of illustration.

Figure 2:
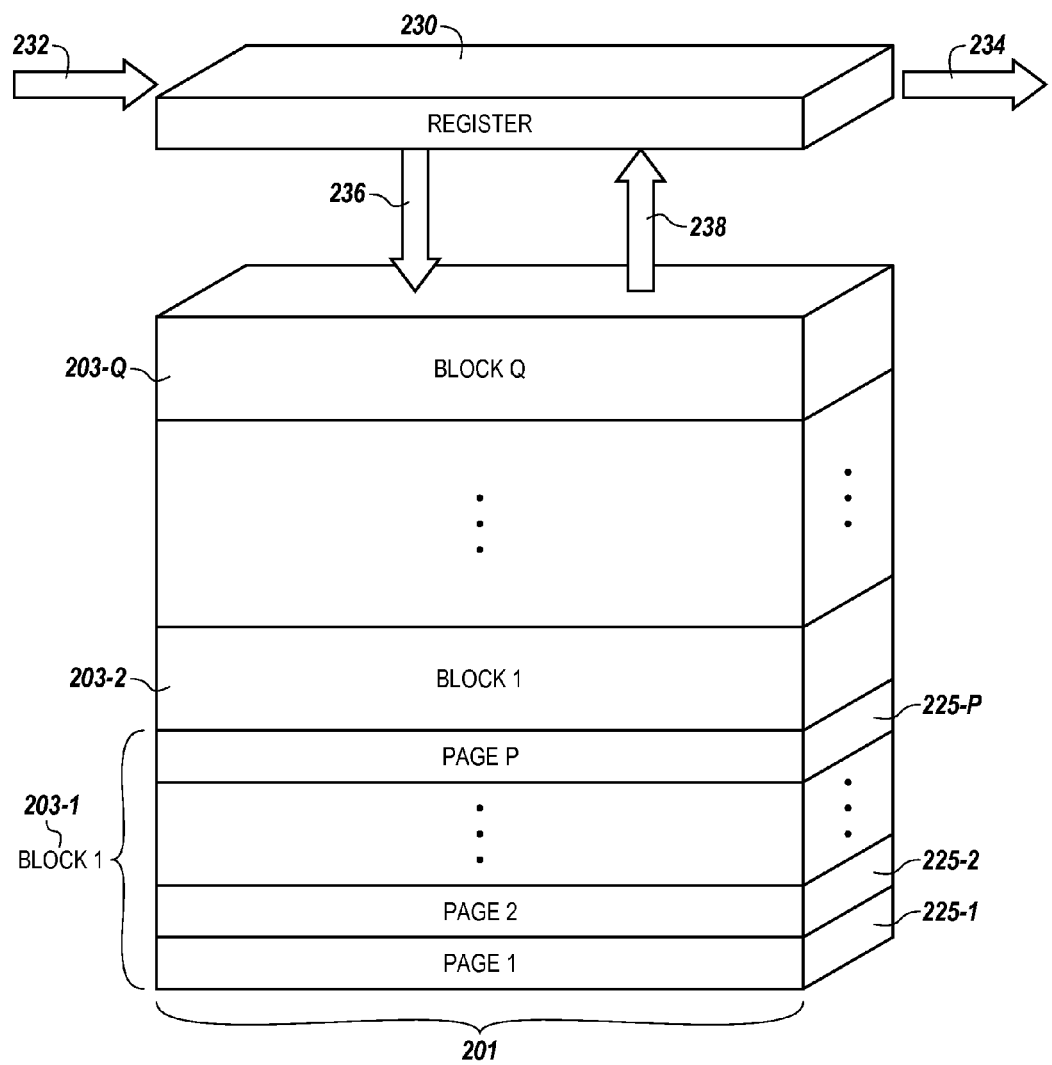
FIG. 2 illustrates a block diagram of a memory architecture in accordance with a number of embodiments of the present disclosure.

FIG. 2 illustrates a block diagram of a memory architecture in accordance with a number of embodiments of the present disclosure. The embodiment of FIG. 2 illustrates a number of pages, 225-1, 225-2, . . . 225-P, included in Block 1, 203-1.

FIG. 2 also illustrates a number of blocks 203-1, 203-2, . . . 203-Q. According to the embodiment illustrated in FIG. 2, blocks 203-1, 203-2, . . . 203-Q together are included in plane 201. Embodiments are not limited to memory devices including one plane, as memory devices may include one plane or more than one plane. Only one plane 201 is illustrated in FIG. 2 so as not to obscure the teachings of the present disclosure. As an example, a 2 GB memory device can include 2112 bytes of data per page, 64 pages per block, and 2048 blocks per plane.

Plane 201 is shown in bidirectional communication with a register 230, e.g., a memory page register, a strobe register, etc., at 236 and 238. Data can be transferred from register 230 to the memory plane 201 at 236 during writing operations. Data can also be transferred from the memory plane 201 to the register 230 during read operations. Register 230 can output data to input/output (I/O) circuitry, e.g., I/O circuitry 160 in FIG. 1, via a memory interface 234 and can have data loaded thereto, e.g., receive data from I/O circuitry via the memory interface 232. Thus, the memory interface can include both output 234 and input 232 to the register 230. In some embodiments of the present disclosure, a data pattern can be input to the register 230 and output from the register 230 without writing the data to the plane 201 and/or reading the data from the plane 201. Register 230 can communicate data with I/O circuitry through a number of data cycles. By way of example, a page of data, e.g., 2 kilobytes (kB) of data, can be loaded into register 230 through a number of 1 byte data cycles, e.g., where the memory interface input 232 and output 234 each include eight connections. Embodiments are not limited to memory devices including a particular page size or data cycle width. Other page sizes can be used with embodiments of the present disclosure, e.g., 4 kB, 8 kB, etc. As the reader will appreciate, a partial page of data can be communicated to and/or from register 230.

Units of a plurality of data patterns can be loaded into and output from at least a portion of the register 230. With respect to the memory interface and the register 230, the input 232 and output 234 can have a particular data width, e.g., 32 bits, which may be referred to as a horizontal number of data units. Data patterns, e.g., test patterns, as used herein may be referred to as vertical data patterns that can be loaded into and/or output from at least a portion of the register 230 sequentially, e.g., one bit at a time. Thus, one unit from each of a number of data patterns can be loaded into and/or output from the register 230 simultaneously, where the number of data patterns is equal to a number of portions, e.g., a width of the input 232 and/or output 234 from the register 230. During a calibration operation of the memory interface, a number of data patterns can be loaded into and/or output from the register 230 without writing a unit of the number of data patterns to the memory, e.g., plane 201, and/or reading a unit of the number of data patterns from the memory. The terms horizontal and vertical do not imply a particular geometric or relative geometric orientation.

A first data pattern can comprise a first test pattern. A second data pattern can comprise a second test pattern. The first data pattern can be sequentially loaded into and output from a first portion of the register 230 to generate a first read capture window associated with the first data pattern. The second data pattern can be sequentially loaded into and output from the first portion of the register 230 to generate a second read capture window associated with the second data pattern, e.g., subsequent to loading and outputting the first data pattern into and from the first portion of the memory register 230. A third data pattern can comprise a third test pattern. In some instances, the first and the second data patterns can comprise aggressor data patterns and the third data pattern can comprise a victim data pattern. The third data pattern can be sequentially loaded into and output from a second portion of the register 230 simultaneously with the first and/or the second data pattern being loaded into and output from the first portion of the register 230. In some embodiments, a first data pattern can be sequentially loaded into and output from more than one portion, e.g., a first portion and a second portion, of the register 230, e.g., where an aggressor data pattern is sequentially loaded into and output from more than one portion of the register 230. Units of a particular data pattern can be output from the register 230 along a same data path 234 as data that is read from the memory plane 201, although the units of the particular data pattern need not be read from the memory plane 201. Such embodiments can help to accurately simulate run time operations that use data output from the register 230 after having been read from the memory plane 201.

Although FIG. 2 illustrates only one register 230 in association with the plane 201, embodiments are not so limited. In some embodiments, a plane 201 can include more than one register, such as a data register and a cache register. A data register can operate in an analogous fashion to register 230, as described above, in that it can transfer data to memory plane 201 and receive data from the memory plane 201. A cache register can operate in an analogous fashion to register 230, as described above, in that it can communicate data to and/or from I/O circuitry through a number of data cycles, e.g., data input cycles or data output cycles. In some embodiments, a register 230 can include a number of latches, where a latch can store a number of units of data.

For those embodiments including both a data register and a cache register, during non-cache operations, the data register and cache register can operate together as a single register, e.g., as register 230. During cache operations, the data register and the cache register can operate separately, e.g., in a pipelined process. For example, during a write operation, data from I/O circuitry, e.g., from a host (for instance, from a processor associated with the host), can be loaded into the cache register, e.g., through a number of serially clocked data cycles, and then transferred from the cache register to the data register. After data is transferred to the data register, the contents of the data register can be written to memory plane 201.

Figure 3:
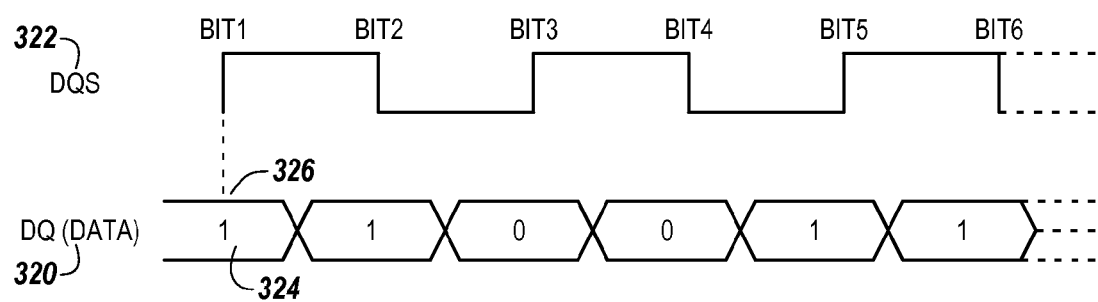
FIG. 3 illustrates capture points centered on a read capture window in accordance with a number of embodiments of the present disclosure.

FIG. 3 illustrates capture points centered on read capture windows in accordance with a number of embodiments of the present disclosure. The data pattern 320, e.g., "110011" is illustrated on a "DQ (Data)" data path. The data path can be a connection to a memory interface such as the I/O connections 162 as illustrated in FIG. 1 and/or the output to I/O circuitry 234 as illustrated in FIG. 2. A number of capture points, e.g., "Bit 1, Bit 2, Bit 3, Bit 4, Bit 5, Bit 6 . . ." are illustrated by the clock signal "DQS" 322, e.g., a DQ strobe. The capture points can indicate where data should be latched. The capture points can correspond to a rising or falling edge of the DQS 322. For example, the capture point for "Bit 1," illustrated by the rising edge of the DQS 322 is at a center 326 of the read capture window 324 for the data "1."

A particular data pattern can be output on a particular connection of a memory interface. A controller can be configured to adjust an adjustable delay circuit each time the particular data pattern is output on the particular connection, e.g., such that the particular data pattern is clocked with each possible delay of the adjustable delay circuit. This can generate a read capture window, e.g., a data eye, which can indicate delays that correctly capture the particular data pattern. Delays that correctly capture the particular data pattern are those delays that place the strobe within the window, e.g., where the eye is "open," such that the circuitry can distinguish between a high and low signal for each bit of the data pattern. In some embodiments, these delays can be recorded by the controller. The controller can set a delay that is approximately in the center of the read capture window as a calibrated data capture point for the memory interface.

The controller can compare the data pattern that is clocked with each delay of the adjustable delay circuit to the particular data pattern that was output on the particular connection to determine which delays correctly capture each unit of the particular data pattern. For example, the controller can set an initial delay of the adjustable delay circuit, output the particular data pattern on a particular connection of the memory interface, and clock the data pattern according to the initial delay, e.g., with a DQ strobe. The controller can compare the clocked data pattern to the particular data pattern. If the clocked data pattern does not match the particular data pattern, the controller can record the initial delay as invalid. The controller can step through a plurality of delays of the adjustable delay circuit following a similar procedure and record each delay that provides a clocked data pattern that matches the particular data pattern. The controller can set, as a calibrated read capture point, the delay that is median to those delays that resulted in a clocked data pattern that matched the particular data pattern. Each connection of the memory interface can be calibrated independently, or in parallel with the other connections, e.g., the calibration points of each connection can be cross-correlated to find a data capture point that correctly captures the respective data pattern on each connection. The adjustable delay circuit can be a delay locked loop (DLL), a phase locked loop (PLL), a ring delay circuit, or another type of adjustable delay circuit.

Figure 4A:
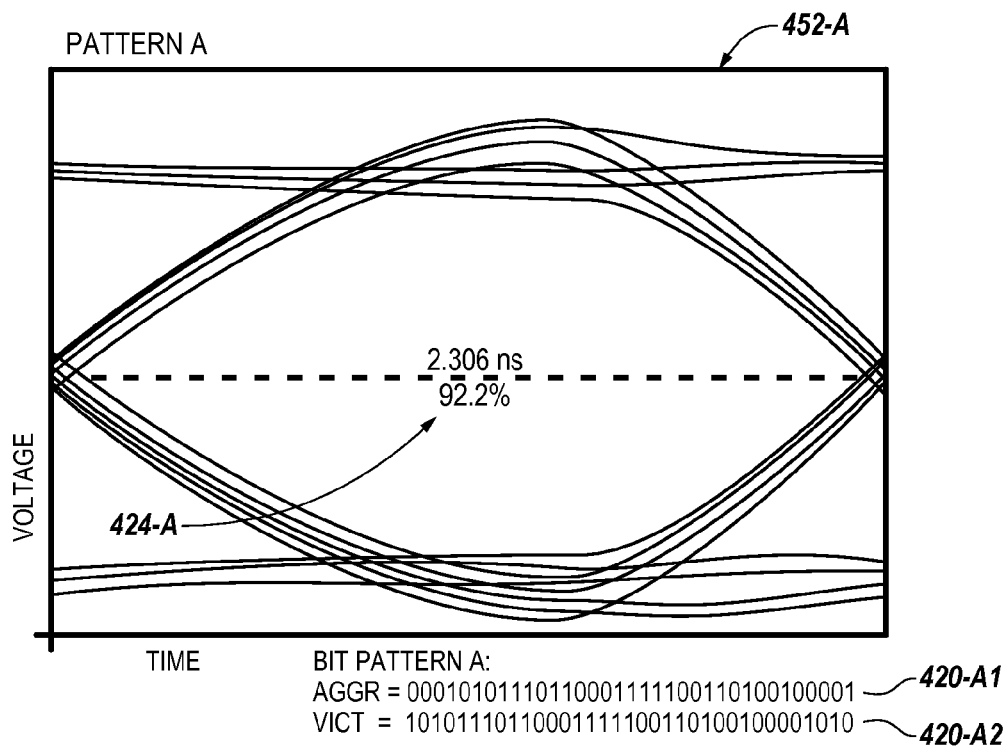
FIGS. 4A-4B illustrate data patterns and read capture windows in accordance with a number of embodiments of the present disclosure.
Figure 4B:
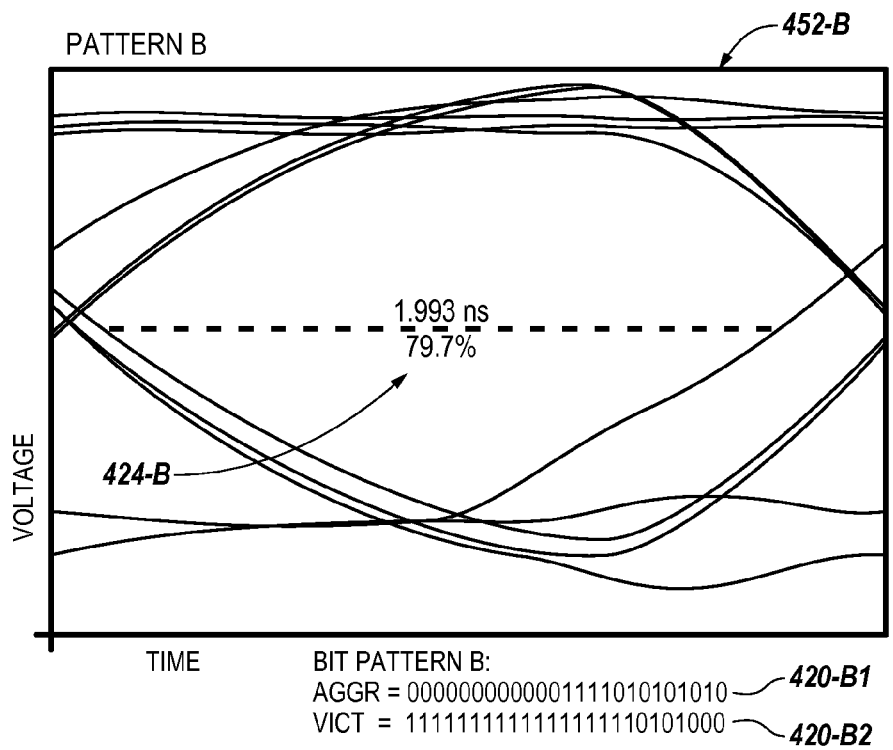

FIGS. 4A-4B illustrate data patterns and read capture windows in accordance with a number of embodiments of the present disclosure. The first display 452-A includes "Pattern A" with the results of outputting an "aggressor" data pattern 420-A1 and a "victim" data pattern 420-A2. The aggressor data pattern 420-A1 and the victim data pattern 420-A2 result in a read capture window 424-A. The aggressor and victim data patterns can closely simulate run time switching conditions on a memory interface, so as to allow more accurate calibration of a data capture point for the memory interface. The memory interface, as described herein, can include a plurality of connections, e.g., a 32-bit wide bus, which can be operated in parallel. A particular data pattern can be input and/or output, e.g., clocked, serially on one of the connections. In some embodiments, an aggressor data pattern can be clocked on a first portion of the number of connections while a victim data pattern is clocked on a second portion of the number of connections. Differential artifacts in the switching of the plurality of connections can be introduced by the aggressor and victim data patterns, thereby allowing consideration of simultaneous switching outputs, crosstalk, routing, loading mismatch, among other conditions on the plurality of connections that can contribute to a worst-case switching condition.

The term's "aggressor" and "victim" are used herein to distinguish between two different data patterns that can be transferred simultaneously on different connections of the memory interface to simulate switching conditions that may be particularly likely to affect the accuracy of data reads, e.g., extreme switching conditions. Such simulation can assist with calibration of a data capture point for the memory interface to allow the capture point to remain centered in the middle of a data signal even under extreme switching conditions during run time. The aggressor and/or victim data patterns can be clocked on some or all of the connections of the memory interface during calibration.

The controller, e.g., controller 170 illustrated in FIG. 1, can be configured to determine at least one respective aggressor data pattern and at least one respective victim data pattern that generate an optimal read capture window for each unit of the register, e.g., register 230 illustrated in FIG. 2. The controller can be configured to calibrate a respective read capture point according to the optimal read capture window for each unit of the register.

The second display 452-B includes "Pattern B" with the results of outputting an aggressor data pattern 420-B1 and a victim data pattern 420-B2. The aggressor data pattern 420-B1 and the victim data pattern 420-B2 result in a read capture window 424-B. Pattern A and Pattern B result from outputting different data patterns on a same memory interface. As can be seen, the different data patterns result in different read capture windows. For example, Pattern A results in a read capture window 424-A having an eye width of 2.306 nanoseconds with an eye opening percentage of 92.2% while Pattern B results in a read capture window 424-B having an eye width of 1.993 ns and an eye opening percentage of 79.7%. Thus, the aggressor data pattern 420-B1 and victim data pattern 420-B2 produced a worse-case read capture window than the aggressor data pattern 420-A1 and the victim data pattern 420-A2 for the same memory interface. A number of embodiments of the present disclosure can select the optimal, e.g., narrowest, read capture window, in this example, read capture window 424-B, and calibrate a data capture point for the memory interface according to the selected read capture window, e.g., by setting a DQ strobe to capture data near a center of the selected read capture window.

A read capture window can be generated for a memory interface. In some embodiments, the memory interface can be tested with a plurality of different data patterns to generate a plurality of read capture windows. In a number of embodiments, the memory interface can be modeled and a number of data patterns and/or read capture windows can be determined according to a PDA performed on the model. For various embodiments including performing a PDA, the data patterns determined by the PDA can be sequentially loaded into and output from a portion of the memory register to generate a number of read capture windows and/or the read capture windows can be generated analytically according to the number of data patterns determined according to the PDA. In some instances, the PDA can determine a number of data patterns that generate an optimal read capture window.

In a number of embodiments, performing PDA can include modeling a unit pulse response as:

$$y(t) = c(t) \otimes p(t)$$

where $y(t)$ is the pulse response, $c(t)$ is a transmitter symbol response, $p(t)$ is an impulse response of the connection, e.g., channel, and receiver, and $\otimes$ denotes convolution. The eye edge due to the worst case 1 is:

$$s_1(t) = y(t) + \sum_{\substack{k=-\infty \\ k \neq 0}}^{\infty} y(t-kT)|_{y(t-kT)<0}$$

where T is the symbol period. If n co-connection, e.g., cochannel, interference sources exist and $y^i$ is the cochannel pulse response, the worst-case 1 eye edge becomes:

$$s_1(t) = y(t) + \sum_{\substack{k=-\infty \\ k \neq 0}}^{\infty} y(t-kT)\bigg|_{y(t-kT)<0} + \sum_{i=1}^{n} \sum_{k=-\infty}^{\infty} y^i(t-kT-t_i)\bigg|_{y^i(t-kT-t_i)<0}$$

where $t_i$ is the relative data capture point, e.g., sampling point, of each cochannel pulse response. The eye edge due to the worst-case 0 is given by:

$$s_0(t) = \sum_{\substack{k=-\infty \\ k \neq 0}}^{\infty} y(t-kT)\bigg|_{y(t-kT)<0} + \sum_{i=1}^{n}\sum_{k=-\infty}^{\infty} y^i(t-kT-t_i)\bigg|_{y^i(t-kT-t_i)>0}$$

Therefore, the worst-case eye opening, e(t), is defined as $s_1(t) \geq e(t) \geq s_0(t)$.

In a number of embodiments, a read capture window analytically generated as a result of performing PDA can be compared to a plurality of read capture windows generated by loading a plurality of data patterns into various portions of the register and outputting the plurality of data patterns from the various portions of the register to select an optimal one of the analytically generated read capture window and the plurality of read capture windows. A data capture point can be calibrated for the memory interface according to the selected read capture window.

CONCLUSION

Apparatuses and methods of calibrating a memory interface are described. Calibrating a memory interface can include loading and outputting units of a first data pattern into and from at least a portion of a register to generate a first read capture window. Units of a second data pattern can be loaded into and output from at least the portion of the register to generate a second read capture window. One of the first read capture window and the second read capture window can be selected and a data capture point for the memory interface can be calibrated according to the selected read capture window.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of a number of the associated listed items.

As used herein, the term "and/or" includes any and all combinations of a number of the associated listed items. As used herein the term "or," unless otherwise noted, means logically inclusive or. That is, "A or B" can include (only A), (only B), or (both A and B). In other words, "A or B" can mean "A and/or B" or "a number of A and B."

It will be understood that, although the terms first, second, third, etc. may be used herein to describe various elements, these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of calibrating a memory interface, comprising:
   loading and outputting units of at least three different data patterns into and from at least a portion of a register to generate at least three different read capture windows;
   selecting a narrowest one of the at least three different read capture windows after discounting a number of narrower read capture windows corresponding to a number of units correctable by error circuitry; and
   calibrating a data capture point for the memory interface according to the selected read capture window.

2. The method of claim 1, wherein loading and outputting units of the at least three different data patterns comprises sequentially loading and outputting units of the at least three different data patterns into and from at least the portion of the register.

3. The method of claim 1, wherein selecting the narrowest one of the at least three different read capture windows comprises selecting the one of the at least three different read capture windows having a shortest duration.

4. The method of claim 1, wherein loading and outputting units of the at least three different data patterns into and from at least the portion of the register includes loading and outputting without writing the units of the at least three different data patterns to memory.

5. The method of claim 1, wherein loading and outputting units of the at least three different data patterns into and from at least the portion of the register includes loading and outputting without reading the units of the at least three different data patterns from the memory.

6. The method of claim 1, wherein loading and outputting units of the at least three different data patterns into and from at least the portion of the register includes loading and outputting without writing the units of the at least three different data patterns to memory or reading the units of the at least three different data patterns from the memory.

7. The method of claim 1, wherein the method includes sequentially loading and outputting units of a fourth data pattern into and from a second portion of the register simultaneously with sequentially loading and outputting units of the at least three different data patterns into and from at least the portion of the register.

8. The method of claim 1, wherein the method includes:
   capturing each of the at least three different data patterns using each of a plurality of delays; and recording those of the plurality of delays that correctly capture each unit of each of the at least three different data patterns.

9. The method of claim 8, wherein calibrating the data capture point for the memory interface according to the selected read capture window further comprises setting a delay for the memory interface as one of the plurality of delays.

10. The method of claim 9, wherein setting the delay for the memory interface comprises setting the delay for the memory interface as one of the plurality of delays that is nearest a center of the selected read capture window.

11. A method of calibrating a memory interface, comprising:
    determining a number of data patterns that generate an optimal read capture window according to a peak distortion analysis (PDA) performed on the memory interface;
    analytically generating a read capture window according to the determined number of data patterns;
    sequentially loading and outputting units of a first plurality of additional data patterns into and from at least a first portion of a register to generate a plurality of additional read capture windows;
    sequentially loading and outputting units of a second plurality of additional data patterns into and from at least a second portion of the register to generate the plurality of additional read capture windows;
    selecting a narrowest one of the analytically generated read capture window and the plurality of additional read capture windows after discounting a number of narrower read capture windows corresponding to a number of units correctable by error circuitry; and
    calibrating a data capture point for the memory interface according to the selected read capture window.

12. The method of claim 11, wherein sequentially loading and outputting units of the first plurality of additional data patterns into and from at least the first portion of the register includes loading and outputting without writing the units of the first plurality of additional data patterns to memory or reading the units of the first plurality of additional data patterns from the memory.

13. A method of calibrating a memory interface, comprising:
    determining a number of data patterns that analytically generate an optimal read capture window according to a peak distortion analysis (PDA) performed on the memory interface;
    loading and outputting a first one of the number of data patterns into and from at least a first portion of a register to generate a first read capture window;
        wherein loading the first one of the number of data patterns into at least the first portion of the register includes loading a first unit of data of the first one of the number of data patterns into a first portion of the register; and
        wherein outputting the first one of the number of data patterns from at least the first portion of the register includes outputting the first unit of data from at least the first portion of the register before loading a second unit of data of the first one of the number of data patterns into at least the first portion of the register;
    loading and outputting a second one of the number of data patterns into and from at least a second portion of the register to generate a second read capture window;
    selecting a narrowest one of the first read capture window and the second read capture window corresponding to number of units correctable by error circuitry; and
    calibrating a data capture point for the memory interface according to the selected read capture window generated by the loading and outputting of the first one and the second one of the number of data patterns.

14. The method of claim 13, wherein loading and outputting units of the first one of the number of data patterns into and from at least the first portion of the register includes loading and outputting without writing the units of the one of the number of data patterns to memory or reading the units of the one of the number of data patterns from the memory.

* * * * *